Figure 1:
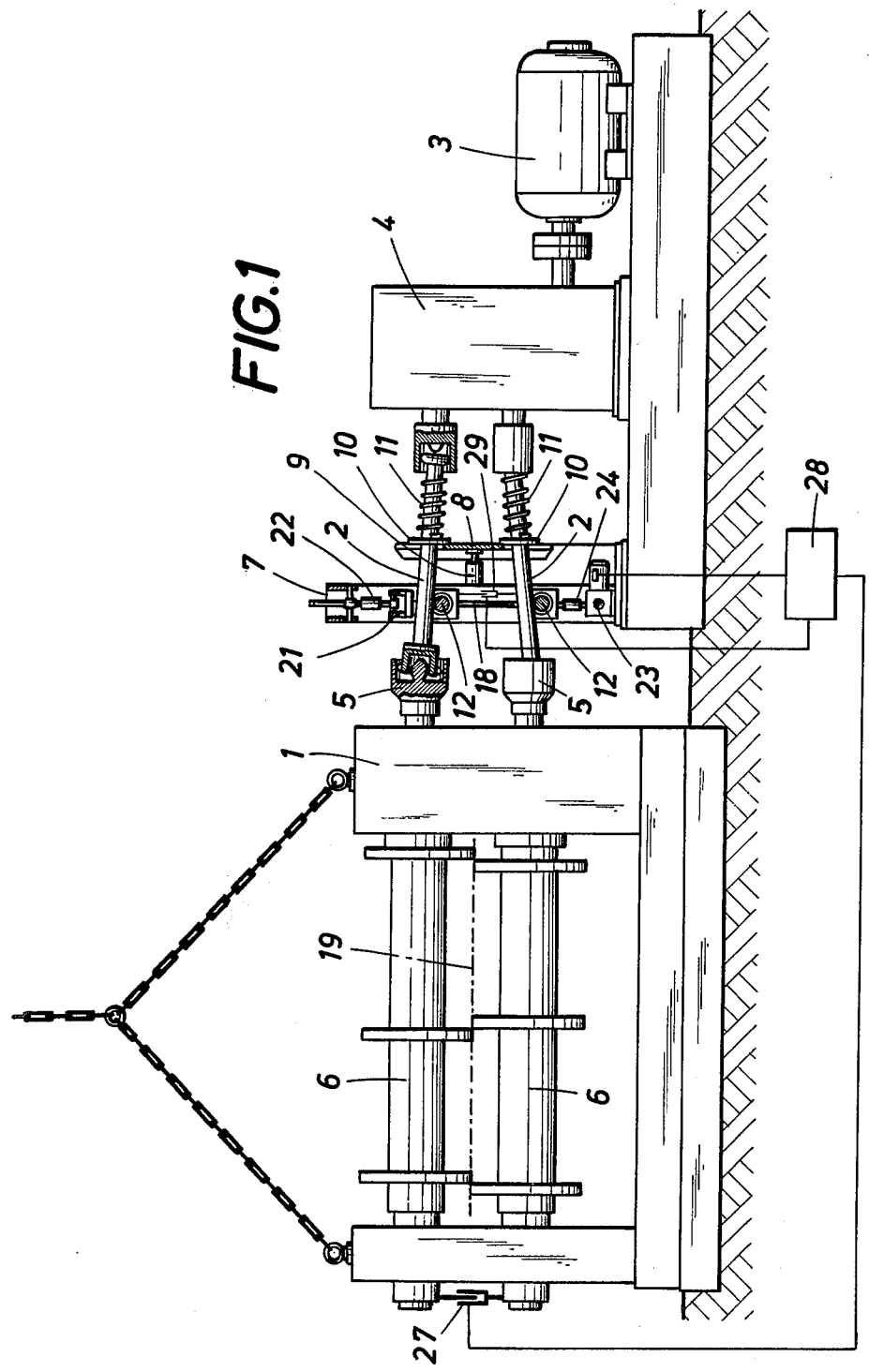

United States Patent [19]

Haslhofer

[11] 4,194,279

[45] Mar. 25, 1980

[54] APPARATUS FOR SUPPORTING TWO UNIVERSAL JOINT SHAFTS AND EQUIPMENT COMPRISING A STRIP-TREATING STAND ADAPTED TO BE DRIVEN BY SAID UNIVERSAL JOINT SHAFTS

[75] Inventor: Hubert Haslhofer, Linz, Austria

[73] Assignee: Vereinigte Osterreichische Eisen- und Stahlwerke - Alpine Montan Aktiengesellschaft, Linz, Austria

[21] Appl. No.: 931,396

[22] Filed: Aug. 4, 1978

[30] Foreign Application Priority Data

Sep. 27, 1977 [AT] Austria .................................. 6881/77

[51] Int. Cl.² ............................................ B25B 27/14
[52] U.S. Cl. .................................................. 29/281.5
[58] Field of Search ................. 29/281.5, 281.1, 281.4; 248/669

[56] References Cited

U.S. PATENT DOCUMENTS

| | | | |
|---|---|---|---|
| 3,566,505 | 3/1971 | Martin | 29/281.5 |
| 3,774,282 | 11/1973 | Hooper | 29/281.5 |
| 4,026,136 | 5/1977 | Pell | 29/281.5 |

Primary Examiner—James L. Jones, Jr.
Attorney, Agent, or Firm—Kurt Kelman

[57] ABSTRACT

Two universal joint shafts for driving a pair of working shafts of a strip-treating stand are arranged one over the other and adapted to be shortened so as to be uncoupled from said working shafts. For a replacement of one or both working shafts, the unversal joint shafts which are uncoupled from the working shafts and are supported by respective seating structures, which are adjustable in height. To enable an automatic coupling of the universal joint shafts to the working shaft and to permit of the use of interchangeable strip-treating stands, which can only be lifted, the seating structures comprise upwardly facing bearing surfaces, which are adapted to support and to clear said universal joint shafts. Said seating structures are mounted in a carrier, which is adjustable in height and carries also means for adjusting said bearing surfaces in height relative to said carrier only by equal distances in opposite directions.

14 Claims, 2 Drawing Figures

APPARATUS FOR SUPPORTING TWO UNIVERSAL JOINT SHAFTS AND EQUIPMENT COMPRISING A STRIP-TREATING STAND ADAPTED TO BE DRIVEN BY SAID UNIVERSAL JOINT SHAFTS

This invention relates to apparatus for supporting two universal joint shafts for driving a pair of working shafts of a strip-treating stand, which universal joint shafts are to be supported during a replacement of a working shaft. The apparatus comprises two seating structures, which are adjustable in height and serve to support the universal joint shafts, which are arranged one over the other and are adapted to the shortened for an automatic disengagement of couplings which connect the universal joint shafts to the working shafts.

To enable a quick replacement of the working shafts of a strip-treating stand, it is known from Austrian Patent Specification No. 272,245 to support a bearing for the coupling head of the universal joint shafts so that the working shafts, which may consist, e.g., of the working shafts of a rolling mill stand or of the knife shafts of a shearing machine, can be axially pulled out of the couplings, which are held in position by retaining jaws, which are moved into engagement with the universal joint heads so that the latter are rotatably mounted between said jaws. The pairs of retaining jaws are jointly adjustable to a proper elevation by hydraulic actuators. That known design has the disadvantage that it involves a relatively large structural expenditure and, above all, that the heads of the universal joint shafts are held in position by the retaining jaws so that the heads of the universal joint shafts cannot be freely connected to the working shafts unless the latter are exactly in a predetermined relation to the universal joint shafts. For this reason these known apparatus do not permit of an automatic coupling. Besides, the working shafts must be pulled out axially so that interchangeable stands, i.e., stands which are replaced entirely, must be shifted in the direction of the working shafts. Moreover, the retaining jaws can be adjusted only in height so that there is no allowance for a horizontal adjustment of the working shafts although this would be required, e.g., for working shafts which are adjusted by an eccentric. The plane of travel of the strip to be worked upon is defined by roller conveyors, and the working shafts are adjusted symmetrically with respect to that plane of travel so that the retaining jaws must be correspondingly adjusted too. For this reason the known design has the disadvantage that the pairs of retaining jaws for the upper and lower universal joint shafts must be individually adjusted in height.

Similar disadvantages are encountered in conjunction with another design, which is known from Opened German Specification No. 2,027,920 and in which the universal joint shafts are supported by rollers carried by a bell crank lever, which is pivoted to a frame and operable to adjust the rollers in height. Because the inclination of the coupling heads of these universal joint shafts can be adjusted and each universal joint shaft is provided for this purpose with a slidable sleeve, which is shifted by a fork mounted in the frame, there is a predetermined relation between the universal joint shafts and the frame in the axial direction so that the working shafts can again be pulled off only in an axial direction. Besides, an adjustment is enabled only in height whereas an adjustment in the horizontal plane is impossible and each universal joint shaft must be individually adjusted.

In order to enable an automatic uncoupling and coupling of working shafts and universal joint shafts, Austrian Patent Specification No. 221,460 teaches to use couplings which have a coupling member forming a funnel-shaped opening for another coupling member, which is provided with a guide pin. That design ensures that the coupling members will automatically interfit when they are pushed together even when the shaft ends to be coupled are not exactly in register. Because the interengaging parts are convex, the shafts to be connected may extend at an angle. When it is desired to disengage these known couplings, the telescopic universal joint shaft is shortened against the force of a return spring so that the two coupling members are pulled apart. Under the restoring force of the spring, the two coupling members are caused to interfit when the shafts are to be connected so that the automatic finding device ensures a reliable interengagement even when the two coupling members are not exactly in register initially.

It is an object of the invention to simplify the replacement of the working shafts of strip-treating stands with the aid of such self-finding quick-release couplings and thus to enable an automatic coupling operation. Besides, a simple use of interchangeable stands which can only be lifted off is to be enabled.

In an apparatus of the kind described first hereinbefore, this object is accomplished in accordance with the invention in that the seating structure have upwardly facing bearing surfaces for supporting the universal joint shafts, which can be lifted off, the bearing surfaces are adjustable in height by equal distances in opposite directions, and the seating structures mechanism are mounted in a carrier, which is adjustable in height. Because the upwardly facing bearing surfaces cannot be adjusted independently of each other but are adjustable in height only by equal distances in opposite directions, a symmetrical movement of the two universal joint shafts with respect to the plane of travel of the strip metal through the strip-treating stand is ensured so that a single drive unit will be sufficient and only that drive unit must be properly controlled. The use of seating structures having upwardly facing bearing surfaces, from which the universal joint shafts can be lifted, in conjunction with the measure that these upwardly facing bearing surfaces and the drive means for adjusting them are mounted in a carrier which is adjustable in height, enables a lowering of the upwardly facing bearing surfaces from the universal joint shafts during the operation of the stand so as to avoid an undesired friction. Even after such lowering, the universal joint shafts can simply be moved into registry with new working shafts which are to be coupled because it is sufficient for that purpose to return the carrier to its working position, in which the coupling heads of the universal joint shafts can be adjusted only symmetrically with respect to the strip plane.

In accordance with a further feature of the invention, each of the upwardly facing bearing surfaces forms a slideway, which extends transversely to the axis of the associated universal joint shaft and is slidably engageable therewith. This feature permits of a simple horizontal adjustment of the working shafts in case of need because the self-finding means of the couplings which are used can shift the universal joint shafts when this is required.

In accordance with the invention, a particularly simple arrangement will be obtained if a power screw mechanism is provided, which comprises two shafts, each of which has two series of oppositely handed screw threads for adjusting the upper and lower universal joint shafts, respectively, so that the upwardly facing bearing surfaces will be positively adjusted in opposite directions by a rotation of said shafts.

Because the seating structures and the mechanism for adjusting their upwardly facing bearing surfaces are mounted in a carrier which is adjustable in height, it would be obvious to support the means for driving the adjusting mechanism also by said carrier. But such an arrangement would require relatively heavy means for moving the carrier. For this reason, a further feature of the invention resides in that the means for driving the power screw mechanism are stationary and are connected to the screw-threaded shafts by couplings which permit of an axial displacement of the screw-threaded shafts. These couplings may consist, e.g., of splined members and ensure a simple transmission of torque.

A particularly simple design will be obtained if the carrier consists of a yoke and is adjustable by a fluid-operable actuator and together with the power screw shafts and the seating structures constitutes a closed frame. This eliminates the need for providing a a carrier consisting of a closed frame in itself so that a structure which is particularly light and inexpensive can be used.

To enable an automatic coupling operation, the means for driving the power screw mechanism for adjusting the upwardly facing bearing surfaces may be controlled in dependence on the center distance between the working shafts, which distance is measured by a suitable sensor, so that the distance between the upwardly facing bearing surfaces is automatically adjusted to the center distance between the working shafts. An automatic control in dependence on a measurement of the actual distance between the upwardly facing bearing surfaces can also be provided of course. It will be understood that this automatic control requires that the proper position of the upwardly facing bearing surfaces relative to the plane of travel of the strip is reliably maintained by the positive adjustment in height of the upwardly facing bearings by equal distances in opposite directions. This can be ensured in a simple manner in that the operating position of the carrier is defined by adjustable stops.

Figure 2:
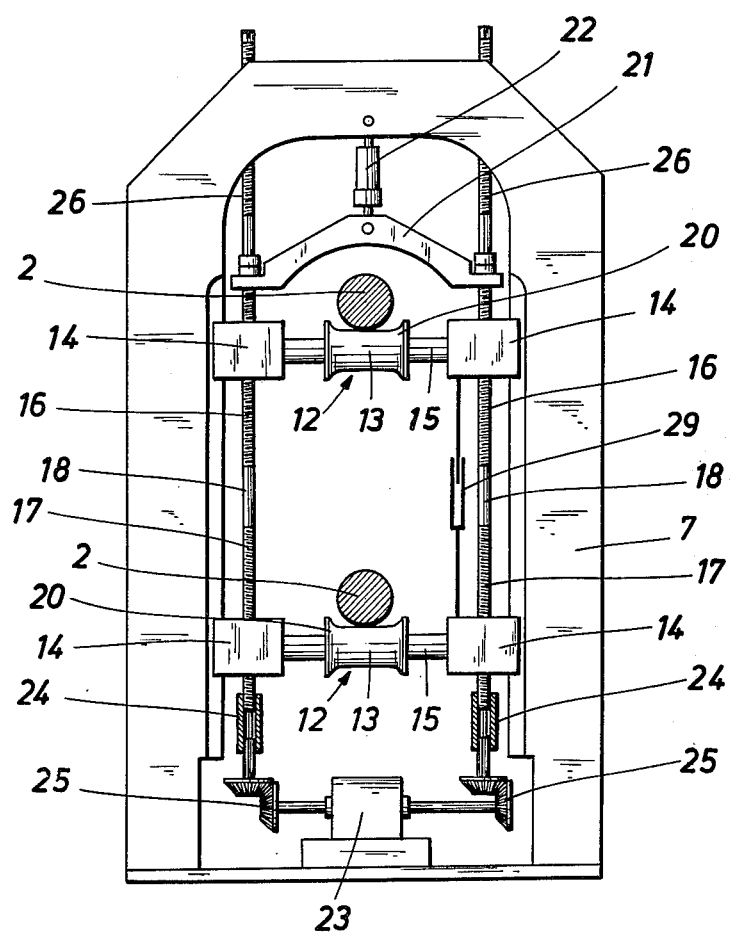

An embodiment of the invention is shown diagrammatically and by way of example on the accompanying drawings, in which FIG. 1 is a partly sectional view showing apparatus according to the invention for supporting two universal joint shafts for driving workping shafts of a shearing machine stand and FIG. 2 is an elevation showing that apparatus on a larger scale.

The shearing machine stand 1 shown in FIG. 1 constitutes an interchangeable stand, which can be lifted as a whole by a suitable hoist. The shearing machine stand 1 is driven by a motor 3 via a power-dividing transmission 4 and two universal joint shafts 2. The latter are telescopic so that they can be shortened to disengage the couplings 5, which connect the universal joint shafts 2 to respective working knife shafts 6 of the stand 1. For this purpose the coupling member secured to each universal joint shaft 2 must be pulled out of the coupling member secured to the associated working shaft 6. This is accomplished by an uncoupling plate 8, which is slidably mounted in a frame 7 and can be horizontally moved by means of a hydraulic actuator 9 and engages abutment flanges 10 provided on the universal joint shafts 2. When pressure in the proper direction is applied to the hydraulic actuator the latter will act via the uncoupling plate 8 on the abutment flanges 10 to push the telescopic universal joint shafts 2 to a shorter length against the force of re-turn springs 11 so that the couplings 5 are disengaged.

Two seating structures 12 are provided. Each seating structure comprises a roller 13, which is mounted on an associated axle 15, which is held in two bearing bodies 14. The outside peripheral surface of each roller 13 forms an upwardly facing bearing surface. These bearing surfaces serve to support the universal joint shafts 2 when they are uncoupled. The universal joint shafts 2 can be adjusted in length even when they are supported by the rollers 13 because the latter are freely rotatably mounted on the axle 15.

The seating structures 12 are adjustable in height by a power screw mechanism, which comprises two shafts 18, each of which has two series of screw threads 16 and 17, which are oppositely handed and in screw-threaded engagement with female screw threads of respective bearing bodies 14 for the upper and lower seating structures 12 so that the shafts 18 can be rotated to positively effect an adjustment of the bearing bodies 14 and of the seating structures 12 by equal distances in opposite directions. As a result, the upwardly facing bearing surfaces of the seating structures 12 can be only symmetrically adjusted with respect to the plane of travel 19 of the strip metal to be acted upon. By means of an eccentric, which is not shown, the working shafts 6 are also only symmetrically adjustable in height with respect to said plane.

Because the adjustment of the working shafts 6 by the eccentric influences not only the vertical center distance between the shafts 6 but adjusts them also in a horizontal direction, the universal joint shafts 2 must be horizontally adjustable too so that they moved into registry with the working shafts 6. For this purpose, the upwardly facing bearing surfaces of the seating structures 12 constitute slideways for the universal joint shafts. In the embodiments shown by way of example, the rollers 13 are so designed that these slideways are constituted by the outside peripheral surfaces of the rollers 13. To prevent a slipping of the universal joint shafts 2 from the rollers 13, the same are provided with radial stop flanges 20 adjacent to their ends.

By means of the seating structures 12 which are adjustable in height by equal distances in opposite directions, the couplings at the ends of the universal joint shafts can be adjusted in a simple manner and with adequate precision for adaptation to the elevations of the two working shafts 6 of a new shearing machine stand 1 so that the self-finding couplings 5 can interengage when the uncoupling plate 8 has been retracted. As the universal joint shafts 2 are transversely slidable on the seating structures 12, the universal joint shafts 2 can be moved into registry with the working shafts 6 even when the latter have been horizontally moved during their adjustment by the eccentric because the required horizontal movement will be imparted to the universal joint shafts 2 by the self-finding couplings 5 as the latter are engaged.

To ensure that the universal joint shafts 2 do not chafe on the seating structures 12 during the operation of the stand 1, said seating structures 12 can be lowered.

This cannot be accomplished by the power screw mechanism, which can impart only equal and opposite movements to the seating structures. For this reason the shafts 18 are rotatably and axially immovably mounted in a carrier 21, which consists of a yoke and can by adjusted in height relative to the frame 7 by a hydraulic actuator 22. Because the carrier 21, the screw-threaded shafts 18, and the seating structures 12 constitute a screw-closed frame, a very simple structure is obtained, which combines adequate stability with low structural expenditure.

To eliminate the need for adjusting in height also the means 23 for driving the screw-threaded shafts 18, the latter are connected to the drive means 23 by splined sleeves 24 and bevel gear trains 25. The splined sleeves 24 permit of an axial adjustment of the screw-threaded sleeves 18 and provide for a transmission of torque.

To ensure that any backlash will be compensated and the upwardly facing bearing surfaces of the seating structures 12 will always be in a correct position relative to the plane of travel 19 stop rods 26 are provided, which are adjustably mounted by means of screw threads in the frame 7 and define the operating position of the carrier 21.

The structure which is illustrated can also be used when new stands are to be automatically coupled because the means 23 for driving the screw-threaded shafts 18 can readily be controlled in dependence on the center distance of the working shafts 6 of the shearing machine stand 1. This can be accomplished in that the center distance between the working shafts 6 is measured by a suitable sensor 27, which in the embodiment shown by way of example consists of an inductive displacement pick-up and which delivers a desired-value signal to a controller 28 for controlling the drive means 23. To ensure that a correct adjustment will be effected, this control system can be supplemented to form a closed-loop control system in that the distance between the upwardly facing surfaces of the seating structures 12 is monitored by a sensor 29 and the actual-value signal delivered by the sensor 29 is applied to the controller 28 and compared therein with the desired-value signal.

What is claimed is:

1. For use with two universal joint shafts arranged one over the other and adapted to be coupled to respective working shafts of a strip-treating stand and to drive said working shafts and to be shortened so as to be uncoupled from said working shafts,
apparatus for supporting said universal joint shafts when they are uncoupled from said working shafts, said apparatus comprising,
a support,
a carrier carried by said support and adjustable in height relative to said support,
two seating structures, which are carried by said carrier and adjustable in height relative thereto and have respective upwardly facing bearing surfaces engageable with respective ones of said universal joint shafts and adapted to support and clear the same, and
a seat-adjusting mechanism carried by said carrier and operatively connected to said seating structures and operable to adjust said bearing surfaces in height relative to said carrier only by equal distances in opposite directions.

2. Apparatus as set forth in claim 1, in which bearing surfaces constitutes a horizontal slideway which is slidably engageable by the associated universal joint shaft so as to extend transversely to the axis thereof.

3. Apparatus as set forth in claim 1, in which
each of said seating structures comprise at least one nut held against rotation relative to said carrier and
said seat-adjusting mechanism comprises at least one vertical shaft, which has two axially spaced apart series of oppositely handed screw threads in screw-threaded engagement with respective ones of said nuts.

4. Apparatus as set forth in claim 3, which comprises stationary drive means for driving said shaft and
a coupling which connects said drive means to said shaft and permits of an axial displacement of said shaft relative to said drive means.

5. Apparatus as set forth in claim 1, in which
each of said seating structures comprises at opposite ends thereof two nuts which are held against rotation relative to said carrier and
said seat-adjusting mechanism comprises two laterally spaced apart vertical shafts, each of which has two axially spaced apart series of, oppositely handed screw threads in screw-threaded engagement with one of said nuts of respective ones of said seating structures.

6. Apparatus as set forth in claim 4, which comprises stationary drive means for driving said shafts and
couplings which connect said drive means to said shafts and permit of an axial displacement of said shafts relative to said drive means.

7. Apparatus as set forth in claim 4, in which
said carrier consists of a yoke, and
said yoke, said shafts, and said seating structures are interconnected to form a closed frame.

8. Apparatus as set forth in claim 7, in which a fluid-operable actuator is mounted on said support and operable to adjust said yoke in height relative to said support.

9. Apparatus as set forth in claim 1, in which a fluid-operable actuator is mounted on said support and operable to adjust said carrier in height relative to said support.

10. Apparatus as set forth in claim 1, which comprises drive means for driving said seat-adjusting means and
a control system for controlling said drive means, said control system comprising a sensor for measuring the center distance of said working shafts and means for controlling said drive means in dependence on the center distance measured by said sensor.

11. Equipment for treating strip, comprising
a strip-treating stand comprising two working shafts having substantially parallel, horizontal axes and disposed one over the other,
two universal joint shafts which are arranged one over the other and adapted to be shortened,
coupling means adapted to automatically couple each of said universal joint shafts to one of said working shafts and to uncouple each of said universal joint shafts from the associated working shaft in response to a shortening of said universal joint shaft, and
apparatus for supporting said universal joint shafts when they are uncoupled from said working shafts, said apparatus comprising
a support
a carrier carried by said support and adjustable in height relative to said support, two seating structures, which are carried by said carrier and adjustable in height relative thereto and have respective upwardly facing bearing surfaces engageable with respective ones of said universal joint shafts and adapted to support and clear the same, and a seat-adjusting mechanism carried by said carrier and operatively connected to said seating structures and operable to adjust said bearing surfaces in height relative to said carrier only by equal and opposite vertical distances.

12. Equipment as set forth in claim 11, in which
each of said bearing surfaces constitutes a horizontal slideway which is slidably engageable by the associated universal joint shaft so as to extend transversely to the axis thereof, and said couplings are self-finding couplings adapted to move said universal joint shafts in a horizontal direction into registry with respective ones of said working shafts when said universal joint shafts are initially out of registry with said working shafts in a horizontal direction.

13. Equipment as set forth in claim 11, which comprises
drive means for driving said seat-adjusting means and
a control system for controlling said drive means, said control system comprising a sensor for measuring the center distance of said working shafts and means for controlling said drive means in dependence on the center distance measured by said sensor.

14. Equipment as set forth in claim 11, in which
said universal joint shafts are telescopic and
means for shortening said universal joint shafts are mounted on said support.

* * * * *